United States Patent
Li

(10) Patent No.: US 9,100,384 B2
(45) Date of Patent: Aug. 4, 2015

(54) METHOD AND APPARATUS FOR ACCESSING HETEROGENEOUS NETWORKS VIA WIRELESS LOCAL AREA NETWORK

(75) Inventor: Guodong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 693 days.

(21) Appl. No.: 12/730,903

(22) Filed: Mar. 24, 2010

(65) Prior Publication Data

US 2010/0251331 A1 Sep. 30, 2010

(30) Foreign Application Priority Data

Mar. 24, 2009 (CN) .......................... 2009 1 0119377

(51) Int. Cl.
*H04W 12/06* (2009.01)
*H04W 4/00* (2009.01)
*H04L 29/12* (2006.01)
(Continued)

(52) U.S. Cl.
CPC ................ *H04L 69/08* (2013.01); *H04W 8/06* (2013.01); *H04W 84/12* (2013.01)

(58) Field of Classification Search
CPC . G06Q 10/06375; G06Q 40/12; G06Q 20/20; G06Q 20/40; G06Q 30/0207; G06Q 30/0283; G06Q 30/0284; G06Q 30/04; G06Q 30/0601; G06Q 40/00; H04L 12/14; H04L 12/26; H04L 41/5003; H04L 41/0893; H04L 63/08; H04L 63/10; H04L 67/306; H04L 9/32; H04M 15/00; H04M 15/58; H04W 4/24; H04W 4/26; H04W 12/08; H04W 8/02; H04W 84/12; G06F 15/173; G06F 15/01

USPC ............................ 726/3, 4, 8; 370/338, 241
See application file for complete search history.

(56) References Cited

U.S. PATENT DOCUMENTS 7,565,326 B2 * 7/2009 Randle et al. .................... 705/65
8,108,921 B2 * 1/2012 Shin et al. ......................... 726/8
(Continued)

FOREIGN PATENT DOCUMENTS

CN    101374138 A    2/2009
CN    101516126 A    8/2009
(Continued)

OTHER PUBLICATIONS

Mostafa, How proxy server servers FTP client? 2005, p. 2 section Userconnection/authentication and Figure 3. http://www.codeproject.com/Articles/9547/How-Proxy-Server-serves-FTP-clients.*

(Continued)

*Primary Examiner* — Michael Chao
*Assistant Examiner* — Shu Chu Gao
(74) *Attorney, Agent, or Firm* — Slater & Matsil, L.L.P.

(57) ABSTRACT

A method and an apparatus for accessing heterogeneous networks via a Wireless Local Area Network (WLAN) are disclosed. The method includes receiving an access request from a WLAN terminal or a portal/policy server; determining a target network that the terminal needs to access according to the access request; converting the access request according to the format of a target network transmission protocol; sending the converted access request to the target network; and receiving an authentication result from the target network, and sending the authentication result to the terminal.

18 Claims, 8 Drawing Sheets

(51) Int. Cl.
   *H04L 29/02*   (2006.01)
   *H04L 29/06*   (2006.01)
   *H04W 8/06*    (2009.01)
   *H04W 84/12*   (2009.01)

(56) References Cited

U.S. PATENT DOCUMENTS

| | | | |
|---|---|---|---|
| 8,151,322 B2* | 4/2012 | Chen et al. | 726/4 |
| 8,731,194 B2* | 5/2014 | Hahn et al. | 380/247 |
| 2002/0065109 A1* | 5/2002 | Mansikkaniemi et al. | 455/566 |
| 2002/0103666 A1* | 8/2002 | Hanai et al. | 705/1 |
| 2002/0110104 A1* | 8/2002 | Surdila et al. | 370/338 |
| 2003/0051041 A1* | 3/2003 | Kalavade et al. | 709/229 |
| 2003/0182431 A1* | 9/2003 | Sturniolo et al. | 709/227 |
| 2005/0080884 A1* | 4/2005 | Siorpaes et al. | 709/223 |
| 2006/0077951 A1 | 4/2006 | Godas | |
| 2007/0004393 A1* | 1/2007 | Forsberg et al. | 455/420 |
| 2008/0072053 A1* | 3/2008 | Halim | 713/176 |
| 2009/0089866 A1* | 4/2009 | Yato et al. | 726/6 |
| 2010/0251331 A1 | 9/2010 | Li | |

FOREIGN PATENT DOCUMENTS

| | | | | |
|---|---|---|---|---|
| DE | WO 2005/051026 | * | 6/2005 | H04Q 7/38 |
| WO | WO 2007/039453 A1 | | 4/2007 | |

OTHER PUBLICATIONS wlan_msc.pdf, Juan Caballero et al. Experimental Study of a Network Access Server for a public WLAN access network, Royal Institute of Techology, KTH, Stockholm, 2002; pp. 1-122 as printed.*
04305537.pdf, Minghui Shi et al. A Service-Agent-Based Roaming Architecture for WLAN/Cellular Integrated Networks,IEEE Transactions on Vehicular Technology, vol. 56, No. 5, Sep. 2007; pp. 1-14 as printed.*
Translation of Chinese Office Action, First office Action of the State Intellectual Property Office of the PRC, Application No. 200910119377.8, Mar. 10, 2010, 8 pages.

* cited by examiner

METHOD AND APPARATUS FOR ACCESSING HETEROGENEOUS NETWORKS VIA WIRELESS LOCAL AREA NETWORK

This application claims priority to Chinese Patent Application No. 200910119377.8, filed on Mar. 24, 2009, which is hereby incorporated by reference in its entirety.

TECHNICAL FIELD

The present invention relates to communications technologies, and in particular, to a method and an apparatus for accessing heterogeneous networks via a wireless local area network.

BACKGROUND

With the development of communications technologies, wireless and broadband communications have already become an important development trend in the future.

On network systems such as Third Generation Partnership Project (3GPP) and Worldwide Interoperability for Microwave Access (WiMAX) networks, the wireless spectrum resources are limited. Because low spectrums (generally smaller than 2 GHz) are occupied by broadcast, TV, military, or civil networks, the wireless bandwidth moves towards high frequency bands. But, high frequency band technologies may bring about a poor indoor coverage. The Wireless Local Area Network (WLAN) has advantages such as low costs and wide application scope, and can support multiple terminals.

The convergence of communication services and the customer-compliance-oriented operation mode need supports from the network convergence technology. The WLAN has the potential of being a supplement to the data networks. A solution to operating multiple data networks may be implemented by accessing via the WLAN. This solution can solve the problem of limited spectrum resources of multiple data networks. In addition, multiple terminals that access the WLAN can access multiple data networks via the WLAN. In this way, the WLAN can share the coverage of the other data networks, thus saving network coverage costs.

The prior art has the following problem. Terminals that access the WLAN are unable to access multiple data networks.

SUMMARY OF THE INVENTION

Embodiments of the present invention provide a method and an apparatus for accessing heterogeneous networks via a WLAN, so that the terminal that accesses the WLAN can access multiple data networks.

The method for accessing heterogeneous networks via the WLAN may be implemented by the following technical solution. An access request is received from a terminal or a portal/policy server. A target network that the terminal needs to access is determined according to the access request. The access request is converted according to the format of the target network transmission protocol. The converted access request is sent to the target network. An authentication result is received from the target network, and the authentication result is sent to the terminal.

An authentication serving gateway provided in an embodiment of the present invention includes a request receiving unit that is adapted to receive an access request from a terminal or a portal/policy server. A target network determining unit is adapted to determine a target network that the terminal needs to access according to the access request. A request converting unit is adapted to convert the access request according to the format of the target network transmission protocol. A request sending unit is adapted to send the converted access request to the target network. An authentication result receiving unit is adapted to receive an authentication result from the target network. An authentication result sending unit is adapted to send the authentication result to the terminal.

A portal/policy server provided in an embodiment of the present invention includes an access request receiving unit adapted to receive an access request from a terminal. A login page sending unit is adapted to send an authentication login page to the terminal after receiving the access request. A login information receiving unit is adapted to receive authentication login information from the terminal. An access request sending unit is adapted to determine an access policy according to the authentication login information and send an access request that carries the access policy to the authentication serving gateway.

The preceding technical solution has the following benefits. The target network that the terminal needs to access is determined according to the access request sent from a WLAN terminal; and an access request that complies with the format of the target network transmission protocol is sent to the target network, so that the WLAN terminal can access multiple data networks.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments of the present invention provide a method, an apparatus, and a system for accessing heterogeneous networks via a WLAN, so that the terminal that accesses the WLAN can access multiple data networks.

First Embodiment

Figure 1:
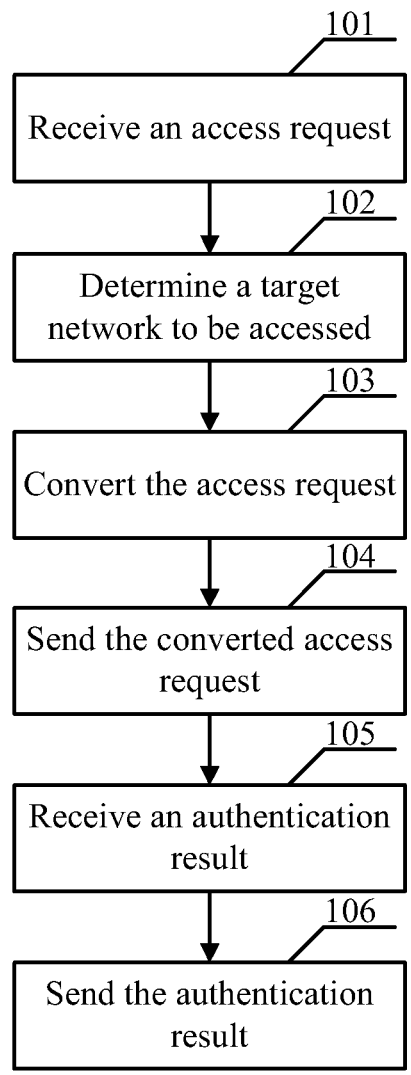
FIG. 1 is a flowchart of a method in an embodiment of the present invention.
Figure 2:
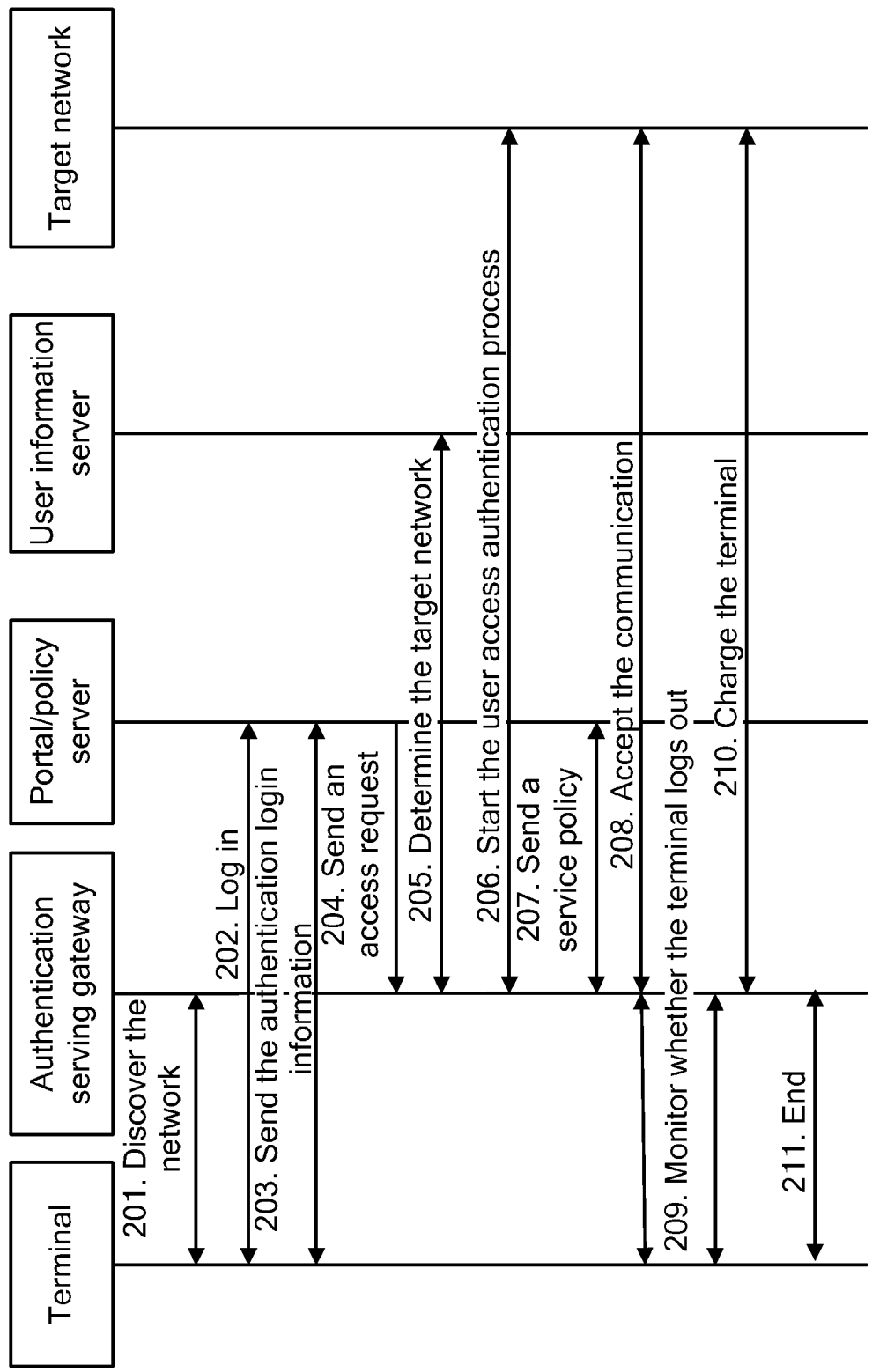
FIG. 2 is a flowchart of another method in an embodiment of the present invention.

As shown in FIG. 1, the method for accessing heterogeneous networks via the WLAN in the first embodiment includes the following steps.

Step 101: Receive an access request from a terminal or a portal/policy server.

The access request may include the information about the target network that the terminal needs to access. The information may be directly indicated in the access request. The information also may be implied in the access request, for example, the home operator and supporting network may be determined according to the number of the terminal.

Step 102: Determine a target network that the terminal needs to access according to the access request.

Step 103: Convert the access request according to the format of the target network transmission protocol.

Step 104: Send the converted access request to the target network.

Step 105: Receive an authentication result from the target network.

Step 106: Send the authentication result to the terminal.

The entities that execute the preceding steps may be various devices that implement authentication conversion for accessing via WLAN, for example, an added authentication serving gateway or devices that integrate a function which can execute the preceding steps. In this embodiment, the target network that the terminal needs to access is determined according to the access request sent from the terminal; and the access request being transformed to comply with the format of the target network transmission protocol is sent to the target network, so that the WLAN terminal can access multiple data networks.

The heterogeneous networks may be data networks different from the WLAN. The data networks different from the WLAN are various. Because these networks are usually based on different protocols or architecture, they are called heterogeneous networks in the embodiments of the present invention.

In this embodiment, the target network that the terminal needs to access is determined according to the access request sent from the terminal; and the access request being transformed to comply with the format of the target network transmission protocol is sent to the target network, so that the WLAN terminal accesses multiple data networks. This solution does not require modification to a terminal and therefore is easy to implement.

Optionally, after receiving the access request from the terminal in step 101, the following steps may further be performed:

sending the access request to the portal/policy server;

sending an authentication login page from the portal/policy server to the terminal;

sending the authentication login information from the terminal to the portal/policy server; and receiving an access request that carries an access policy from the portal/policy server.

Then, the step 102 of determining a target network that the terminal needs to access according to the access request may be as follows:

determining the target network that the terminal needs to access according to the access policy carried in the access request sent from the portal/policy server.

Further, after receiving the authentication result from the target network in step 105, the following steps may be performed:

sending the authentication result to the portal/policy server;

receiving service policy information from the portal/policy server; and obtaining the charging information according to the user service information collected based on the service policy information; and then sending the charging information to at least one of the following: a Business Operation Support System (BOSS), the target network, and a local charging system.

In the preceding embodiment, the policies for accessing heterogeneous networks are uniformly managed by the portal/policy server, thus simplifying the authentication serving gateway and facilitating the management of the heterogeneous network information.

In addition, the unified authentication or unified charging of the WLAN and multiple networks may promote the convergence of these networks.

Optionally, after receiving the service policy information from the portal/policy server, the service policy information may be further sent to the terminal.

Optionally, after receiving the service policy information from the portal/policy server, the following steps may be performed:

monitoring whether heartbeat times out or whether a logout message is received from the terminal; and if the heartbeat times out or a logout message is received from the terminal, stopping obtaining the charging information and disconnecting the network.

In the preceding embodiment, the user is informed of the terminal service policy information, which makes the user's right to know the services the user used come true and lays a foundation for changing the service policy. Whether a heartbeat times out is monitored. If it is detected that the heartbeat times out, the terminal that is connected but is idle may be disconnected, thus saving access resources.

Second Embodiment

For example, in this embodiment, the authentication serving gateway and portal/policy server are configured to implement authentication conversion for WLAN access. The following WLAN takes the Wireless Fidelity (WiFi) of the Institute of Electrical and Electronics Engineers (IEEE) 802.11b standard as an example.

In this embodiment, the WiFi terminal may establish a communication connection with the authentication serving gateway through an Access Point (AP). A Home Subscriber Server (HSS) may also be configured to implement authentication conversion. The target network may include an Authentication, Authorization and Accounting (AAA) server, a billing system or BOSS, and a Home Location Register (HLR).

Step 201: The WiFi terminal discovers the network, and enters the WiFi coverage area to access a local area network. During the process of accessing the local area network, a Dynamic Host Configuration Protocol (DHCP) server may allocate an IP address to the WiFi terminal. The IP address may be used as the communication address between the WiFi terminal and the local area network.

Step 202: The WiFi terminal executes the login process. In this process, the WiFi terminal sends an access request to the authentication serving gateway. For example, the WiFi terminal opens the browser and enters any Internet address to connect to the Internet. After receiving the access request, the authentication serving gateway redirects the request (the redirection may be routing redirection). That is, the authentication serving gateway changes the accessed Internet address to the authentication page address of a portal/policy server, where the portal/policy server may be a portal server or a policy server. The portal/policy server feeds back an authentication login page to the WiFi terminal. The preceding authentication login page may be a Web portal page.

Step 203: The WiFi terminal receives authentication login information entered on the Web authentication login page, where the authentication login information may be the user name and password, and then sends the authentication login information to the portal/policy server.

Step 204: The portal/policy server sends an access request to the authentication serving gateway.

The portal/policy server may store IDs of various types of user names and corresponding operator information. When receiving the authentication login information from the terminal, the portal/policy server may determine policies such as the access policy, authentication policy, and charging policy of the terminal. The access policy may be carried in the preceding access request that the portal/policy server sends to the authentication serving gateway.

Step 205: The authentication serving gateway determines a target network that the terminal needs to authenticate or charge according to the access request. In the preceding determine process, the condition for determining a target network that the terminal needs to authenticate or charge may be obtained from an HSS.

The authentication serving gateway converts the user authentication login information into a standard access request that meets the format of the target network. The standard access request may be converted according to the format of the target network transmission protocol.

Step 206: The authentication serving gateway sends the converted standard user access request to the target network to start the user access authentication process. After the target network is authenticated, the authentication serving gateway receives an authentication result from the target network.

Step 207: The authentication serving gateway sends the authentication result to the portal/policy server. If the authentication succeeds, the portal/policy server may send the service policy information of the user to the authentication serving gateway. The service policy may include information such as types of services that the user subscribes to. The portal/policy server may also send the access policy of the WiFi terminal to the authentication serving gateway and the WiFi terminal. If the WiFi and a Global System for Mobile Communications (GSM) are available at the same time, the terminal may select a proper access mode. For example, it uses the WiFi first to establish voice communication services, thus saving toll fees.

In addition, the user may send a change request for changing the required service or a query request for querying for the services subscribed by the user to the portal/policy server on the Web portal page. Then, the portal/policy server may send the service information subscribed by the user to the WiFi terminal according to the query request or change the services subscribed to by the user according to the change request.

Step 208: The WiFi terminal accepts communications of normal services. In this process, the terminal may always interact with the target network through the authentication serving gateway, and the authentication serving gateway may collect the user service information.

Step 209: The authentication serving gateway monitors whether the terminal logs out. For example, the monitoring method may be: The authentication serving gateway monitors whether the heartbeat times out (it may periodically check whether the data link is still in the activated state; if no response is made after the preset time ends, the heartbeat times out.) or whether a logout request is received from the WiFi terminal; if it is detected that the heartbeat times out or a logout message is received from the terminal, the process goes to step 211.

Step 210: The authentication serving gateway sends the obtained charging information to the target network. The target network may charge the WiFi terminal according to the obtained charging information, and send the obtained charging information to the local charging system and the home charging system of the user. The local operator network and home operator network allocate fees and benefits according to a protocol. If the charging information is customized by the BOSS, the authentication serving gateway may send the obtained charging information to the BOSS.

Step 211: The authentication serving gateway stops charging and disconnects the Internet (logout process).

In this embodiment, the authentication serving gateway may act as the access control component of the WLAN, and manage the WLAN session access. In this embodiment, the process of sending an authentication page to the terminal by the portal/policy server and returning the login information by the terminal is a user authentication process based on the Web Portal, which may be implemented by using following multiple methods:

First method: A one-time login password is used. The user enters a mobile phone number on the Web portal authentication page, and sends the mobile phone number to the portal server. The portal server feeds back a one-time login password through short messages. After the user obtains the password, the user enters the password on the Web portal authentication page for authentication. This method has the following merit: When the user needs network services, the portal server sends a one-time password; this method features high security and is of a post-paid type.

Second method: The terminal subscribes to and registers with the operator network before accessing the network, and deposits money in the terminal account. This method is of a prepaid type.

Third Embodiment

Figure 3:
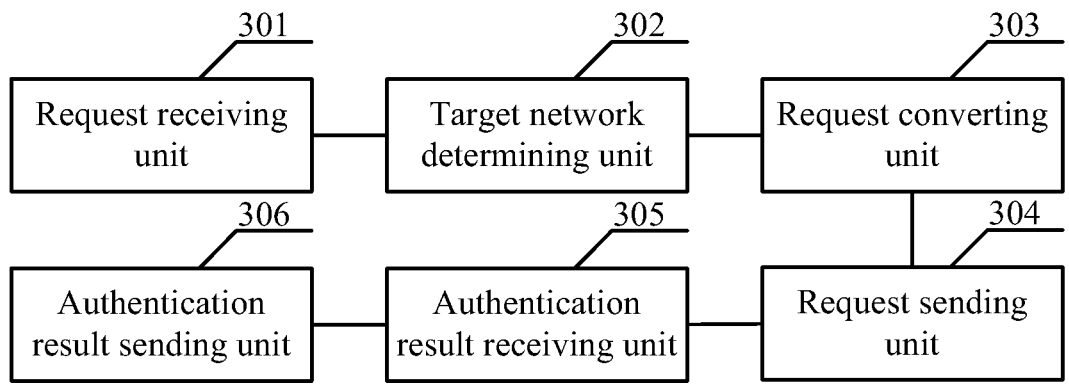
FIG. 3 shows a schematic diagram of an authentication serving gateway in an embodiment of the present invention.

As shown in FIG. 3, an authentication serving gateway provided in this embodiment includes:

a request receiving unit 301, adapted to receive an access request from a terminal or a portal/policy server;

a target network determining unit 302, adapted to determine a target network that the terminal needs to access according to the access request;

a request converting unit 303, adapted to convert the access request according to the format of the target network transmission protocol;

a request sending unit 304, adapted to send the converted access request to the target network;

an authentication result receiving unit 305, adapted to receive the authentication result sent from the target network; and an authentication result sending unit 306, adapted to send the authentication result to the terminal.

Further, the request sending unit 304 is further adapted to send the access request from the terminal received by the request receiving unit 301 to the portal/policy server.

Figure 4:
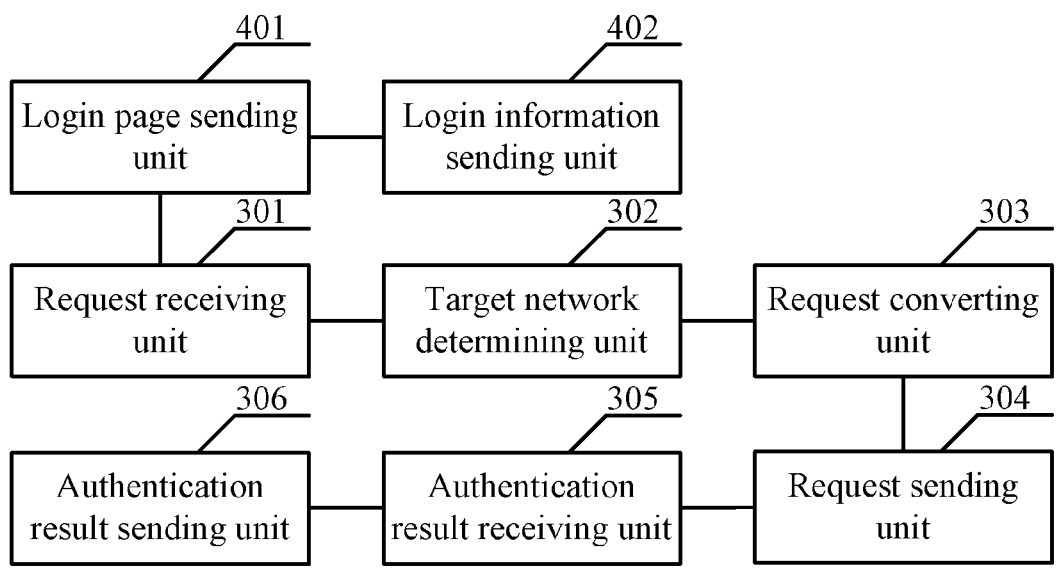
FIG. 4 shows a schematic diagram of another authentication serving gateway in an embodiment of the present invention.

As shown in FIG. 4, the preceding authentication serving gateway may further include:

a login page sending unit 401, adapted to send the authentication login page from the portal/policy server to the terminal;

a login information sending unit 402, adapted to send the authentication login information from the terminal to the portal/policy server;

Optionally, the request receiving unit 301, adapted to receive an access request from the portal/policy server, where the access request carries an access policy; and the target network determining unit 302, adapted to determine a target network that the terminal needs to access according to the access policy carried in the access request sent from the portal/policy server.

Optionally, the preceding authentication result sending unit 306 is further adapted to send the authentication result to the portal/policy server.

Figure 5:
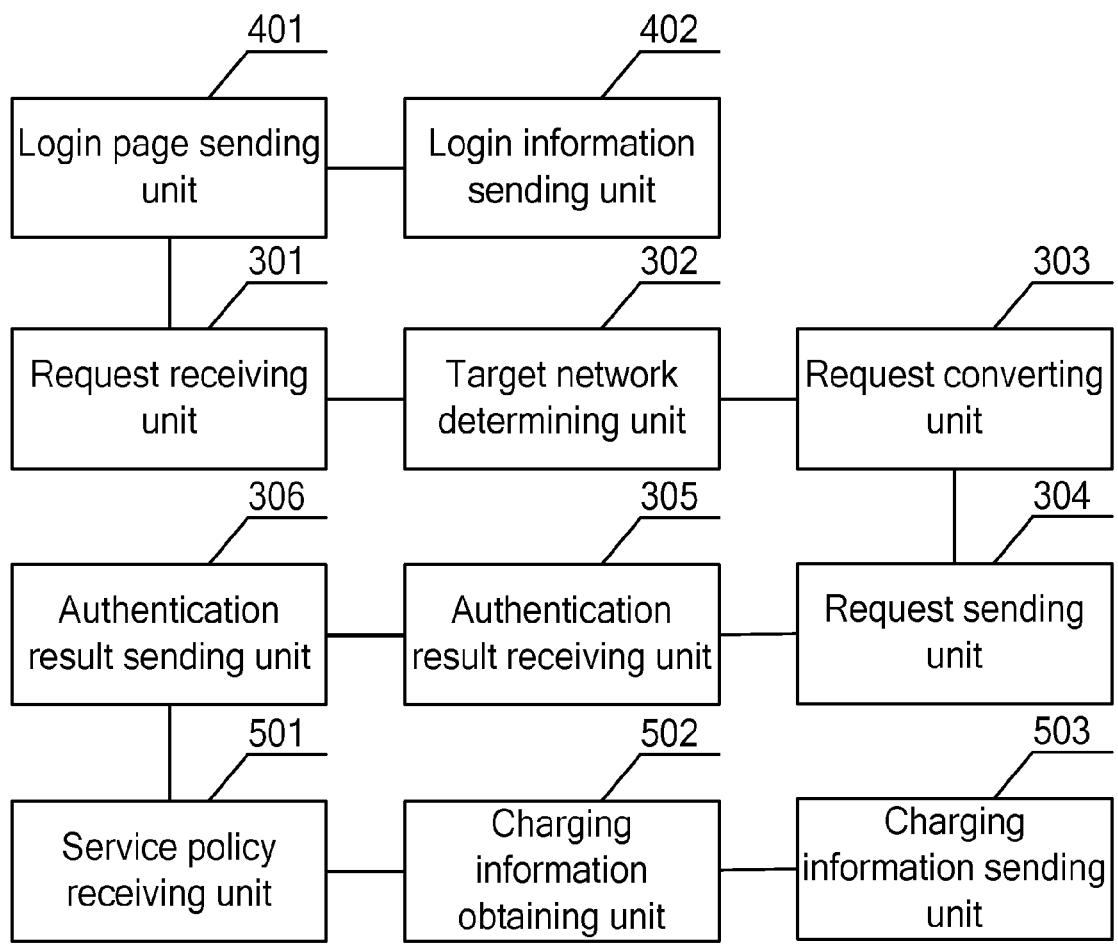
FIG. 5 shows a schematic diagram of the authentication serving gateway with charging functions in an embodiment of the present invention.

As shown in FIG. 5, the preceding authentication serving gateway may further include:

a service policy receiving unit 501, adapted to receive the service policy information from the portal/policy server after the authentication result sending unit 306 sends the authentication result to the portal/policy server;

a charging information obtaining unit 502, adapted to obtain charging information according to the user service information collected base on the service policy information; and a charging information sending unit 503, adapted to send the charging information obtained by the charging information obtaining unit 502 to at least one of the following: the BOSS, the target network, and the local charging system.

Figure 6:
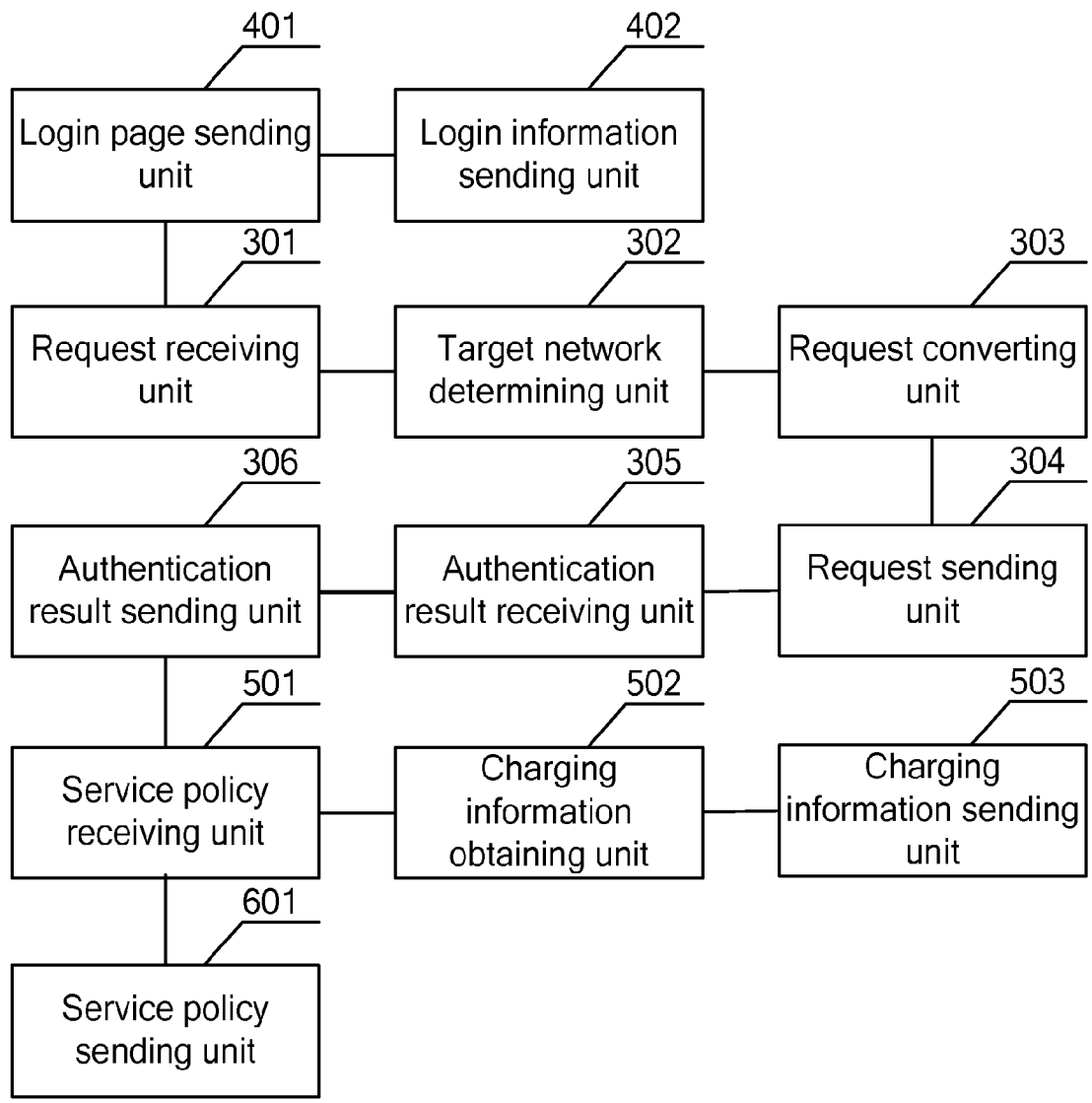
FIG. 6 shows a schematic diagram of another authentication serving gateway in an embodiment of the present invention.

As shown in FIG. 6, the preceding authentication serving gateway may further include:

a service policy sending unit 601, adapted to send the service policy information to the terminal.

Figure 7:
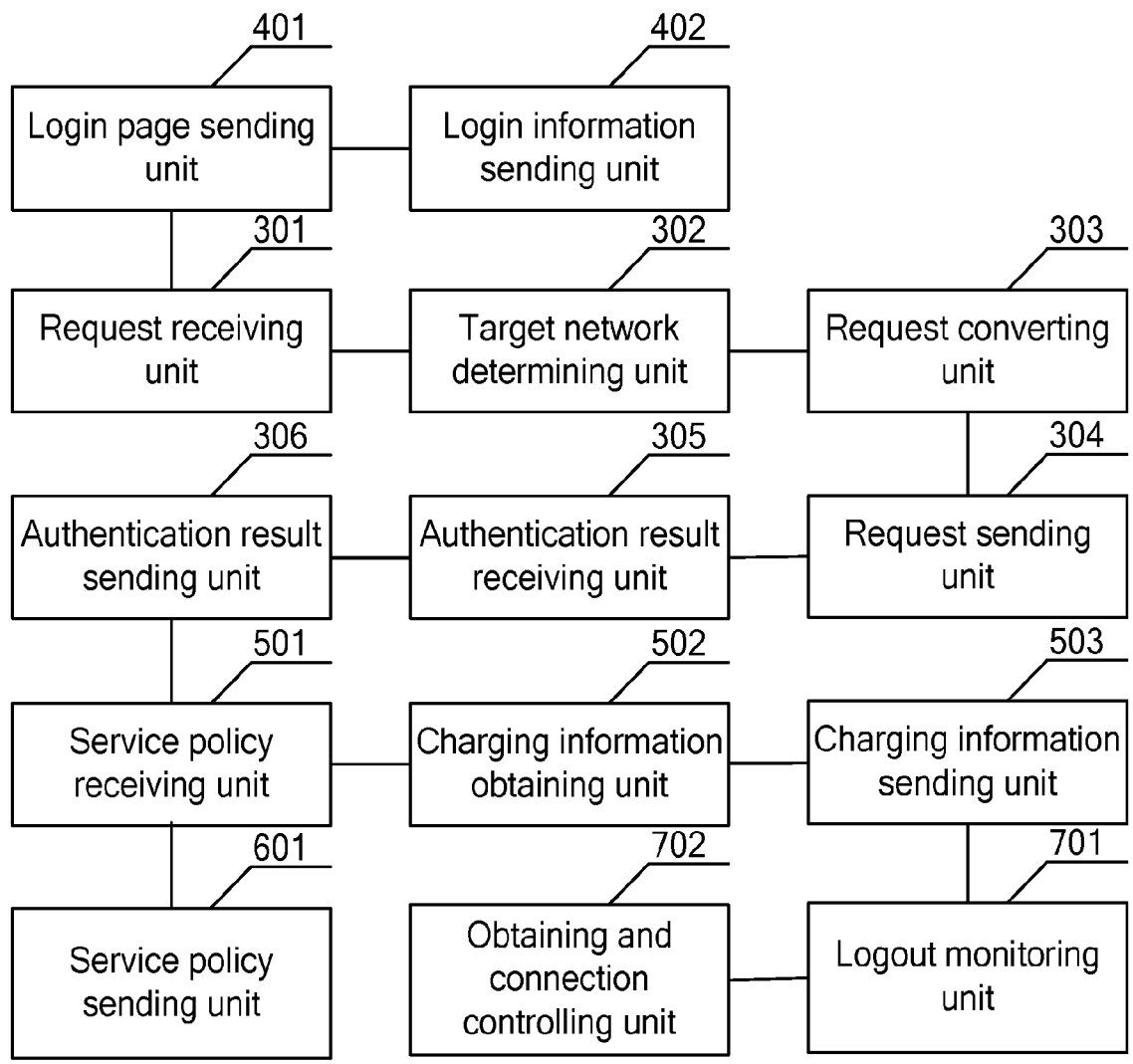
FIG. 7 shows a schematic diagram of the authentication serving gateway with a monitoring unit in an embodiment of the present invention.

As shown in FIG. 7, the preceding authentication serving gateway may further include:

a logout monitoring unit 701, adapted to: monitor whether the heartbeat times out and whether a logout message is received from the terminal; and an obtaining and connection controlling unit 702, adapted to: stop obtaining the charging information and disconnect the network if the heartbeat times out or a logout message is received from the terminal.

In this embodiment, the target network that the terminal needs to access is determined according to the access request sent from the WLAN terminal; and an access request that complies with the format of the target network transmission protocol is sent to the target network, so that the WLAN terminal accesses multiple data networks.

The policies for accessing heterogeneous networks are uniformly managed by the portal/policy server. In this way, the authentication serving gateway may be simplified and the heterogeneous network information may be managed clearly.

In addition, the unified authentication or unified charging of the WLAN and multiple networks may promote the convergence of these networks.

In the preceding implementation method, the user is informed of the terminal service policy information, which reflects the user's right to know the truth and lays a foundation for changing the service policy. If it is detected that the heartbeat times out, the terminal that is connected but is idle may be disconnected, thus saving access resources.

Fourth Embodiment

Figure 8:
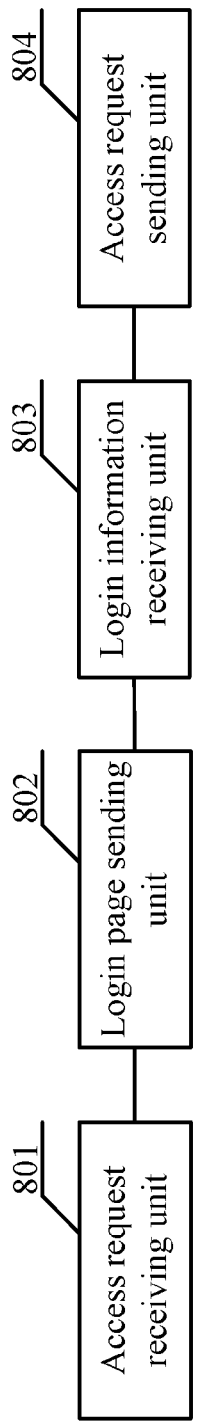
FIG. 8 shows a schematic diagram of a portal/policy server in an embodiment of the present invention.

As shown in FIG. 8, the portal/policy server provided in this embodiment includes:

an access request receiving unit 801, adapted to receive an access request from the terminal;

a login page sending unit 802, adapted to send an authentication login page after receiving the access request;

a login information receiving unit 803, adapted to receive the authentication login information; and an access request sending unit 804, adapted to: determine an access policy according to the authentication login information, and send an access request that carries the access policy to the authentication serving gateway.

Figure 9:
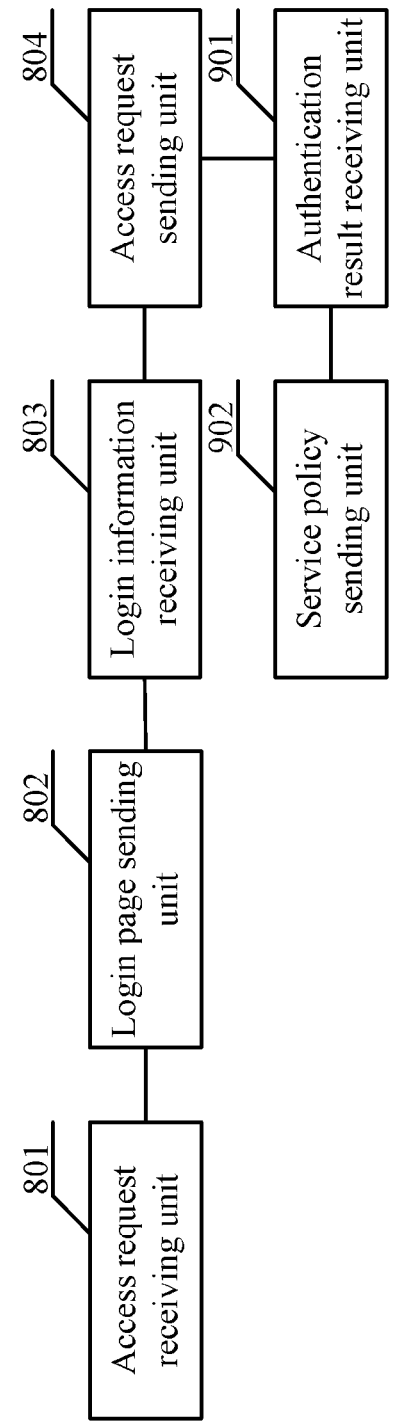
FIG. 9 shows a schematic diagram of another portal/policy server in the third embodiment of the present invention.

As shown in FIG. 9, the preceding portal/policy server may further include:

an authentication result receiving unit 901, adapted to receive the authentication result from the authentication serving gateway; and a service policy sending unit 902, adapted to send the service policy information corresponding to the authentication result to the authentication serving gateway.

The policies for accessing heterogeneous networks are uniformly managed by using the portal/policy server. In this way, the authentication serving gateway may be simplified and the heterogeneous network information may be managed clearly.

Fifth Embodiment

Figure 10:
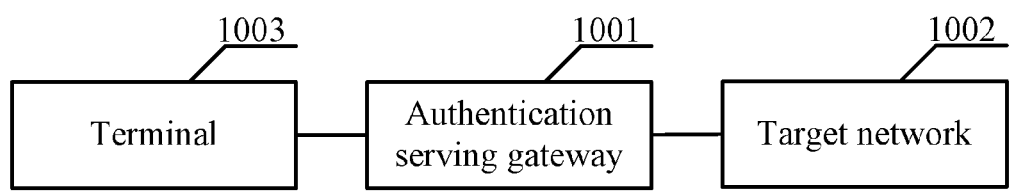
FIG. 10 shows a schematic diagram of a system in an embodiment of the present invention.

As shown in FIG. 10, the system for accessing heterogeneous networks via the WLAN in this embodiment includes an authentication serving gateway 1001, a target network 1002, and a terminal 1003 that are mutually connected.

The authentication serving gateway 1001 is adapted to: receive an access request from the terminal 1003; determine the target network 1002 that the terminal 1003 needs to access according to the access request; convert the access request according to the format of the transmission protocol required by the target network 1002; send the converted access request to the target network 1002; receive an authentication result from the target network 1002, and send the authentication result to the terminal 1003.

Figure 11:
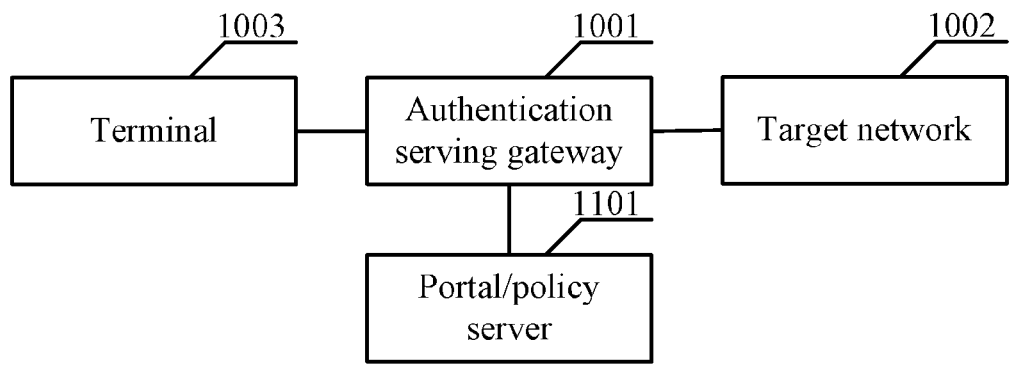
FIG. 11 shows another schematic diagram of the system in an embodiment of the present invention.

Optionally, as shown in FIG. 11, the system may further include a portal/policy server 1101.

The authentication serving gateway 1001 is further adapted to receive the access request from the portal/policy server 1101. After receiving the access request from the portal/policy server 1101, the authentication serving gateway 1001 is further adapted to: send the access request from the terminal to the portal/policy server 1101; send the authentication login page from the portal/policy server to the terminal 1003; send the authentication login information from the terminal 1003 to the portal/policy server 1101; receive an access request that carries the access policy from the portal/policy server 1101; and determine the target network 1002 that the terminal 1003 needs to access according to the access policy in the access request from the portal/policy server 1101.

The portal/policy server 1101 is adapted to: receive an access request from the terminal 1003; send the authentication login page to the authentication serving gateway 1001 after receiving the access request; receive the authentication login information, determine the access policy according to the authentication login information, and send an access request that carries the access policy to the authentication serving gateway 1001.

Further, the preceding authentication serving gateway is further adapted to send the preceding authentication result to the portal/policy server 1101; receive the service policy information from the portal/policy server 1101; and obtain the charging information according to the user service information collected base on the service policy information, and send the charging information to at least one of the following: the BOSS, the target network 1002, and the local charging system.

The portal/policy server 1101 is further adapted to: receive the authentication result from the authentication serving gateway 1001, and send the service policy information corresponding to the authentication result to the authentication serving gateway 1001.

In this embodiment, the target network that the terminal needs to access is determined according to the access request sent from the WLAN terminal; and an access request that complies with the format of the target network transmission protocol is sent to the target network, so that the WLAN terminal accesses multiple data networks.

The policies for accessing heterogeneous networks are managed by using the portal/policy server. In this way, the authentication serving gateway may be simplified and the heterogeneous network information may be managed clearly.

In addition, the unified authentication or unified charging of the WLAN and multiple networks may promote the convergence of these networks.

Those skilled in the art may understand that all or part of the steps in the preceding embodiments may be performed by a program instructing relevant hardware. The program may be stored in a computer readable storage medium such as a Random-Access Memory (RAM), a memory, a Read-Only Memory (ROM), an Electrically-Programmable Read-Only Memory (EPROM), an Electrically-Erasable Programmable Read-Only Memory (EEPROM), a register, a hard disk, a removable disk, a Compact Disc-Read Only Memory (CD-ROM), or a storage medium of any forms well-known to persons skilled in the art.

Detailed above are a method, an apparatus, and a system for accessing heterogeneous networks via the WLAN under the present invention. Although the invention is described through several exemplary embodiments, the invention is not limited to such embodiments. It is apparent that those skilled in the art can make various modifications and variations to the invention without departing from the spirit and scope of the invention. The invention shall cover the modifications and variations provided that they fall within the scope of protection defined by the following claims or their equivalents.

What is claimed is:

1. A method for accessing a heterogeneous network via a Wireless Local Area Network (WLAN), the method comprising:
   receiving, by an authentication serving gateway, an access request from a server, wherein the access request includes information relating to a target network that a terminal needs to access via the WLAN, wherein the heterogeneous network is the target network;
   determining, by the authentication serving gateway, the target network that the terminal needs to access according to the access request from the server, wherein a transmission protocol of the target network is different from that of the WLAN;
   converting, by the authentication serving gateway, the access request according to the transmission protocol of the target network;
   sending, by the authentication serving gateway, the converted access request to the target network;
   receiving, by the authentication serving gateway, an authentication result from the target network; and
   sending, by the authentication serving gateway, the authentication result to the server;
   wherein the access request from the server carries an access policy; and
   wherein the determining the target network that the terminal needs to access comprises determining the target network that the terminal needs to access according to the access policy in the access request.

2. The method of claim 1, wherein the method further comprises:
   receiving, by the authentication serving gateway, service policy information from the server;
   obtaining, by the authentication serving gateway, charging information according to user service information collected based on the service policy information; and
   sending, by the authentication serving gateway, the charging information to at least one of a Business Operation Support System (BOSS), the target network, and a local charging system.

3. The method of claim 2, wherein the method further comprises:
   sending, by the authentication serving gateway, the service policy information to the terminal.

4. The method of claim 2, wherein the method further comprises:
   monitoring, by the authentication serving gateway, whether a heartbeat times out or whether a logout message is received from the terminal; and
   if the heartbeat times out or the logout message is received from the terminal, stopping obtaining further charging information and disconnecting the target network.

5. An authentication serving gateway, comprising:
   a request receiving unit, adapted to receive an access request from a server, wherein the access request includes information relating to a target network that a terminal needs to access via a Wireless Local Area Network (WLAN);
   a target network determining unit, adapted to determine the target network that the terminal needs to access according to the access request from the server, wherein a transmission protocol of the target network is different from that of the WLAN;
   a request converting unit, adapted to convert the access request according to the transmission protocol of the target network;
   a request sending unit, adapted to send the converted access request to the target network;
   an authentication result receiving unit, adapted to receive an authentication result from the target network; and
   an authentication result sending unit, adapted to send the authentication result to the server;
   wherein the access request from the server carries an access policy from the server; and
   wherein the target network determining unit is adapted to determine the target network that the terminal needs to access according to the access policy in the access request.

6. The authentication serving gateway of claim 5, wherein the authentication serving gateway further comprises:
   a service policy receiving unit, adapted to receive service policy information from the server after the authentication result sending unit sends the authentication result to the server;
   a charging information obtaining unit, adapted to obtain charging information according to user service information collected based on the service policy information; and
   a charging information sending unit, adapted to send the charging information obtained by the charging information obtaining unit to at least one of a Business Operation Support System (BOSS), the target network, and a local charging system.

7. The authentication serving gateway of claim 6, further comprising:
   a service policy sending unit, adapted to send the service policy information to the terminal.

8. The authentication serving gateway of claim 7, further comprising:

a logout monitoring unit, adapted to monitor whether a heartbeat times out or whether a logout message is received from the terminal; and an obtaining and connection controlling unit, adapted to stop obtaining further charging information and disconnect the target network if the heartbeat times out or the logout message is received from the terminal.

9. A server, comprising:

an access request receiving unit, adapted to receive an access request from a terminal;

a login page sending unit, adapted to send an authentication login page to the terminal when the access request is received from the terminal;

a login information receiving unit, adapted to receive authentication login information from the terminal;

an access request sending unit, adapted to determine an access policy according to the authentication login information and send a second access request that comprises the access policy to an authentication serving gateway to determine a target network that the terminal needs to access via a Wireless Local Area Network (WLAN); and an authentication result receiving unit, adapted to receive an authentication result from the authentication serving gateway;

wherein a transmission protocol of the target network is different from that of the WLAN; and wherein the server comprises a policy server or a portal server.

10. The server of claim 9, further comprising:

a service policy sending unit, adapted to send service policy information corresponding to the authentication result to the authentication serving gateway.

11. The method of claim 1, the method further comprising sending, by the authentication serving gateway, the authentication result to the terminal.

12. The method of claim 1, the method further comprising:

sending, by the authentication serving gateway, a second access request from the terminal to the server;

sending, by the authentication serving gateway, an authentication login page from the server to the terminal; and sending, by the authentication serving gateway, authentication login information from the terminal to the server to perform authentication of the terminal.

13. The method of claim 1, wherein the server comprises a portal server.

14. The method of claim 1, wherein the server comprises a policy server.

15. The authentication serving gateway of claim 5, further comprising an authentication result sending unit, adapted to send the authentication result to the terminal.

16. The authentication serving gateway of claim 5, further comprising:

a login page sending unit, adapted to send an authentication login page from the server to the terminal; and a login information sending unit, adapted to send authentication login information from the terminal to the server to perform authentication of the terminal.

17. The authentication serving gateway of claim 5, wherein the server includes a portal server.

18. The authentication serving gateway of claim 5, wherein the server includes a policy server.

* * * * *